No. 816,196. PATENTED MAR. 27, 1906.
W. S. TUTTLE.
PULLEY BLOCK.
APPLICATION FILED DEC. 29, 1905.
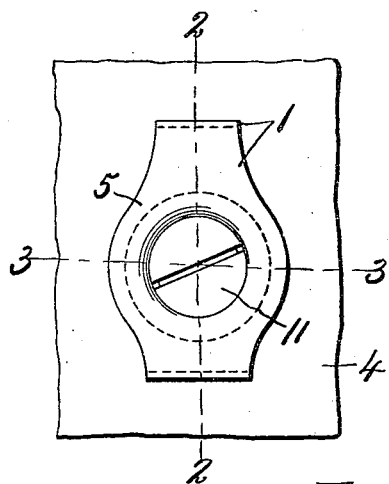
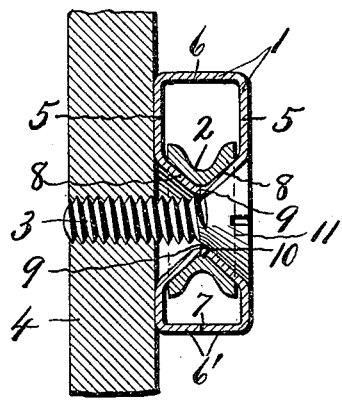
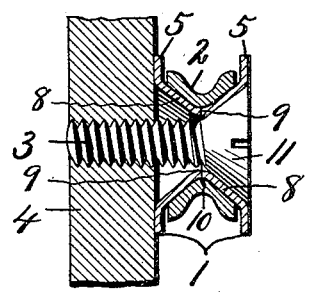
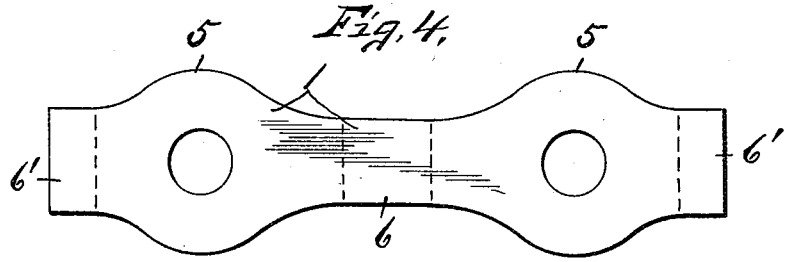
WITNESSES:
B. E. Robinson
H. E. Chase
INVENTOR:
W. S. Tuttle
BY Howard P. Denison
ATTORNEY.

UNITED STATES PATENT OFFICE.

WILLARD S. TUTTLE, OF BROOKLYN, NEW YORK.

PULLEY-BLOCK.

No. 816,196.  Specification of Letters Patent.  Patented March 27, 1906.

Application filed December 29, 1905. Serial No. 293,776.

*To all whom it may concern:*

Be it known that I, WILLARD S. TUTTLE, of Brooklyn, in the county of Kings, in the State of New York, have invented new and useful Improvements in Pulley-Blocks, of which the following, taken in connection with the accompanying drawings, is a full, clear, and exact description.

This invention relates to certain improvements in pulleys, including a pulley-block therefor, and refers more particularly to the construction of the block or frame as associated with a pulley having concaved or dished ends and to the means for clamping these parts to a suitable support.

The essential purpose of my invention is to provide a one-piece sheet-metal block or housing bent into substantially rectangular form in edge view and having the intermediate portions of opposed sides perforated and depressed inwardly, forming recesses in the outer faces, and conical inner projections adapted to enter corresponding recesses in the ends of the pulley.

A further object is to loop the sheet-metal block around the diametrically opposite sides and ends of the pulley and to offset the ends inwardly toward each other so as to abut, and thereby limit the inward compression of the sides of the block or housing to prevent binding of the conical bearings upon the opposite ends of the pulley.

A still further object is to provide the cone-bearings of the block or housing and also the interposed pulley with central alined apertures for receiving the clamping screw or bolt by which the whole device may be clamped or attached to a suitable support.

Other objects and uses will appear in the following description.

In the drawings, Figure 1 is a face view of the pulley embodying the features of my invention. Figs. 2 and 3 are sectional views taken on lines 2 2 and 3 3, Fig. 1. Fig. 4 is a plan of the blank for forming the pulley-block or housing.

As shown in the drawings, the invention comprises, essentially, a one-piece sheet-metal housing or pulley-block 1, a pulley or sheave 2, and a clamping bolt or screw 3, by which the pulley and its block may be attached to any available support, as 4.

The pulley-block or housing 1 is formed from a single piece of sheet metal, similar in form to that shown in Fig. 4, and is bent or folded into the form of a substantially rectangular closed loop having its intermediate portion at both ends of the pulley and its ends folded or bent inwardly and abutting against each other at the opposite ends of the pulley for holding the sides of the housing or block against undue inward compression by the screw 3. This pulley-block or housing, therefore, comprises opposite similar sides 5 and ends 6 and 6', the end 6' being divided at 7, so that the sides 5 may be sprung apart a sufficient distance to permit insertion or removal of the pulley 2 between said sides.

The diameter of the pulley 2 is somewhat less than the distance between the ends 6 and 6' of the pulley-block 1 and is provided with opposite concave or conical recesses in its end faces, and the adjacent portions of the opposite sides 5 of the pulley-block 1 are depressed inwardly, forming convex or conical bearings 8, which fit more or less closely in the similarly-formed recesses in the ends of the pulley 2, the inturned abutting extremities of the pulley-block being of sufficient length or transverse width to prevent binding of the cones 8 against the adjacent faces of the pulley 2. These conical depressions 8 and pulley 2 are respectively provided with central alined apertures 9 and 10, through which the clamping-bolt 3 is passed and screwed into a suitable support 4 for holding the pulley and its block in operative position, said screw or bolt 3 being provided with a head 11, which in this instance fits within the recess in the adjacent side 5 of the pulley-block and lies wholly within the plane of the outer faces of said side, thereby giving the block a neat external appearance, free from projections or obstructions, and the cones abutting centrally in the pulley.

I am aware that it is not broadly new to provide a one-piece sheet-metal frame with inwardly-depressed portions forming opposite cone-bearings for rollers, casters, and the like, such a device being clearly shown in Patent No. 643,719, particularly in Fig. 11; but I believe that I am the first to extend the ends of such a frame or housing across diametrically opposite faces of the pulley, so as to abut against each other and prevent excessive compression of the cone-bearings against the pulley, thereby obviating any liability of binding or producing undue friction between the pulley and cone-bearings. I also believe that I am the first to pass a screw or bolt through central apertures in the cone-bearings and pulley and into an outside support, whereby the pulley-block and its pulley are clamped together to the support by the same clamping-bolt without liability of causing undue friction between the pulley and its block.

The pulley 2 may be made of sheet or cast metal or may be turned up from any solid bar to fit within its supporting-block 1, and the sides 5, having the conical bearings 8, are usually enlarged laterally to a greater or less width than the diameter of the wheel or pulley 2 and are preferably wider, so as to practically conceal the pulley, except at the open sides of the block through which the cable passes.

In assembling the parts of my invention the pulley-block 1 is sprung apart at the dividing-line 7 a sufficient distance to permit the insertion of the pulley 2 between the cone-bearings 8 until the conical recesses in the opposite ends of said pulley are registered with their respective bearings, whereupon the sides of the pulley-block are brought together until the ends abut against each other at 7, thereby centering the central opening in the pulley 2 with the openings in the cone-bearings 8, whereupon the bolt 3 is passed through the alined apertures in the bearings 8 and pulley 2 and screwed into the support 4, thus affording not only opposite cone-bearings, but also a central cylindrical bearing for the pulley.

What I claim is—

1. A pulley having concave end faces and a central opening, a one-piece sheet-metal pulley-block having opposite sides depressed inwardly and entering the recesses in opposite ends of the pulley, said depressed portions of the block having apertures alined with the central aperture in the pulley, said pulley-blocks extending across diametrically opposite faces of the pulley and having its ends abutting against each other.

2. A pulley having concave end faces and a central opening, a one-piece sheet-metal pulley-block having its intermediate portion extending across one face of the pulley and its ends extending across the ends of the pulley and inwardly toward each other at the opposite face of the pulley, said ends abutting against each other, apertures in the opposite arms of the pulley-block, a support at one side of the block provided with an aperture, and a bolt passed through the support, and apertures in the pulley, and a bolt for holding the pulley in the block and screwing the block to the support.

3. A one-piece sheet-metal pulley-block bent into the form of a rectangular loop and having its ends bent inwardly and abutting against each other, whereby the opposite arms of the block may be sprung apart to receive the pulley, the meeting ends serving to hold the arms a fixed distance apart.

4. A one-piece sheet-metal pulley-block having its opposite ends bent in parallel planes and its extremities, abutting against each other and separable at the meeting line.

5. A one-piece sheet-metal pulley-block bent into the form of a loop and having its ends offset inwardly and abutting against each other to limit the approach of the sides toward each other, said sides having portions thereof depressed inwardly and provided with central apertures.

6. A one-piece sheet-metal pulley-block having opposite arms or sides spaced apart and terminating in inturned ends, abutting against each other, said arms or sides having portions thereof depressed inwardly and provided with central apertures.

7. A one-piece pulley-block bent into the form of a loop having its ends abutting at one side of the pulley and its sides depressed inwardly, forming cones which abut end to end centrally within the pulley.

In witness whereof I have hereunto set my hand this 21st day of December, 1905.

WILLARD S. TUTTLE.

Witnesses:
SILAS TUTTLE,
CHARLES C. HICKEY.